United States Patent
Fan et al.

(10) Patent No.: US 10,630,431 B2
(45) Date of Patent: Apr. 21, 2020

(54) DATA RE-TRANSFERRING METHOD BASED ON BIT TRANSFORMATION

(75) Inventors: Tao Fan, Shenzhen (CN); Hao Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/620,896

(22) Filed: Sep. 15, 2012

(65) Prior Publication Data

US 2013/0010883 A1 Jan. 10, 2013

Related U.S. Application Data

(63) Continuation of application No. 10/491,303, filed as application No. PCT/CN02/00222 on Mar. 29, 2002, now Pat. No. 8,295,398.

(30) Foreign Application Priority Data

Sep. 30, 2001 (CN) .................................. 01136044.5

(51) Int. Cl.
*H04L 5/12* (2006.01)
*H04L 1/18* (2006.01)
*H04L 1/00* (2006.01)
*H04L 27/34* (2006.01)

(52) U.S. Cl.
CPC .......... *H04L 1/1819* (2013.01); *H04L 1/0003* (2013.01); *H04L 1/1867* (2013.01); *H04L 27/3405* (2013.01)

(58) Field of Classification Search
CPC . H04L 1/1819; H04L 27/3405; H04L 1/0003; H04L 1/1867

USPC .......................................... 375/261, 298, 320
See application file for complete search history.

(56) References Cited

U.S. PATENT DOCUMENTS

| | | | |
|---|---|---|---|
| 5,822,371 A | 10/1998 | Goldstein et al. | |
| 5,968,198 A | 10/1999 | Hassan et al. | |
| 5,983,382 A | 11/1999 | Pauls | |
| 6,247,150 B1 | 6/2001 | Niemela | |
| 6,259,744 B1 * | 7/2001 | Lee | H04L 1/0071 |
| | | | 375/264 |

(Continued)

FOREIGN PATENT DOCUMENTS

| | | |
|---|---|---|
| EP | 1 168 703 A2 | 1/2002 |
| EP | 1 253 759 A1 | 10/2002 |
| WO | WO 00/65726 | 11/2000 |
| WO | WO 01/67617 A2 | 9/2001 |
| WO | WO 02/067491 A1 | 8/2002 |

OTHER PUBLICATIONS

"Enhanced HARQ Method with Signal Constellation Rearrangement," TSG-RAN Working Group 1 Meeting #19, Feb. 27-Mar. 2, 2001, pp. 1-11.

(Continued)

*Primary Examiner* — Dhaval V Patel
(74) *Attorney, Agent, or Firm* — Leydig, Voit & Mayer, Ltd.

(57) ABSTRACT

A data re-transferring method is based on bit transformation in a communication system. The communication system adopts a high order modulation and supports a re-transferring mechanism. The method includes transforming bits of data to be retransferred in a symbol according to a selected transformation mode, mapping the transformed bits to one constellation figure, and performing Quadrature Amplitude Modulation for the mapped bits.

22 Claims, 2 Drawing Sheets

(56) References Cited

U.S. PATENT DOCUMENTS

| | | |
|---|---|---|
| 6,772,378 B1 * | 8/2004 | Ishihara et al. ............... 714/704 |
| 8,238,374 B2 * | 8/2012 | Xu et al. ...................... 370/476 |
| 2002/0046379 A1 | 4/2002 | Miki et al. |
| 2003/0039229 A1 * | 2/2003 | Ostman ................ H04L 1/0001 370/335 |
| 2003/0081690 A1 | 5/2003 | Kim et al. |
| 2003/0120990 A1 | 6/2003 | Elbwart et al. |
| 2004/0049725 A1 | 3/2004 | Golitschek et al. |

OTHER PUBLICATIONS

International Search Report for International Application No. PCT/CN02/00222, dated Jul. 11, 2002, 2 pages.

$3^{rd}$ Generation Partnership Project, Technical Specification Group Radio Access Network, Multiplexing and channel coding (FDD) (Release 4), 3GPP TR 25.855 V1.0.0, Jun. 2001, 62 pages.

Validity Sear Report for European Patent Application No. 1447935B1, dated Aug. 17, 2012, 47 pages.

Communication pursuant to Article 96(2) EPC received in European Patent Application No. 02 721 958.3-1237, dated Aug. 23, 2007, 5 pages.

Communication pursuant to Article 94(3) EPC received in European Patent Application No. 02 721 958.3-1237, dated Feb. 28, 2008, 5 pages.

Supplementary European Search Report under Article 157(2)(a) received in European Patent Application No. 02721958.3-2415, dated Dec. 6, 2006, 4 pages.

\* cited by examiner

DATA RE-TRANSFERRING METHOD BASED ON BIT TRANSFORMATION

This application is a continuation of U.S. patent application Ser. No. 10/491,303, filed on Mar. 30, 2004, which is a National Stage of International Application No. PCT/CN2002/00222, filed on Mar. 29, 2002, which claims priority to Chinese Patent Application No. 01136044.5, filed on Sep. 30, 2001, all of which are incorporated herein by reference.

TECHNICAL FIELD

The present invention relates to data re-transferring technique, and more particularly to a data re-transferring method based on bit transformation to ensure data reliability after multiple re-transferring processes that transform bit locations of the data before modulation.

BACKGROUND

During period of data transferring process in a communicating system, errors of transmission data or failures of not receiving the transmission data usually happen from time to time, which will influence normal work of the whole system. In order to ensure normal system operation, some systems that support re-transferring function will send the same data continuously until receiving an accurate response indicating the data has been received from opposite side. In a communication system in which data are transferred through Quadrature Amplitude Modulation (QAM), the transferred data is determined by the symbols adopted in constellation figure, in other words, during the data transferring process, the data in X axis corresponding to a symbol in constellation figure is transmitted first, and then the data in Y axis corresponding to the symbol is transmitted. Nevertheless, when number of bits modulated to a symbol is greater than or equal to 4, transmission reliability of different bits in the symbol may be different from one another. Because of which, the reliability difference will enlarged after several re-transferring processes, this will further reduce reliability of the entire data, and influence normal performance of the system at the same time. Any attempts to keep reliability of the data bits unchanged after every transferring process will reduce performance of the decoder because of different bit reliability within a symbol.

In order to equipoise and improve reliability of each bit within a symbol during re-transferring process and raise decoding performance, an enhanced Hybrid Automatic Repeat reQuest (HARQ) method based on signal constellation figure arrangement has been provided. The method modifies reliability of different bits within each symbol through changing constellation figure of high order modulation during each re-transferring process, so that consistence of the reliability among different bits within each symbol during different re-transferring processes is kept, and performance of the decoder that is based on the re-transferring processes is improved. However, both receiver and sender must store all the necessary constellation figures that may be used in this method, which needs large storage capacity, especially in case of high order modulations, because the higher the modulation order is, the more transformation constellation figures are needed, and the larger storage capacity is needed.

The fundamental principle for realizing the above-mentioned HARQ method is adopting different Gray code figures in each data re-transferring process. Taking high order modulation on 16QAM data as an example, there can be several variations of constellation figures in high order QAM. But because each symbol in 16QAM is composed of four bits, four different and symmetric constellation figures are generally adopted as constellation transferring figures during re-transferring process to meet the requirements, in which the four constellation figures are employed periodically. FIG. 1 to FIG. 4 show four selected rectangular 16QAM constellation figures which may be used in the HARQ method, wherein, $i_1$ represents the highest bit of the symbol, $q_1$ represents the 2nd bit of the symbol, $i_2$ is the 3rd bit and $q_2$ is the lowest bit.

It can be seen from FIG. 1 that change probability of $i_1q_1$ is smaller than that of $i_2q_2$, which shows the reliability of $i_1q_1$ is higher than that of $i_2q_2$ when transferring data with the constellation figures. Similarly, FIG. 2 shows $i_2q_2$ has a greater change probability than $i_1q_1$, and $i_2q_2$ has higher reliability than $i_1q_1$ while transferring data according to the constellation figures. In this way, adopting the selected constellation figures in turn at each transferring process can ensure reliability of each bit in the data after several re-transferring processes keeping consistent essentially. Table 1 shows the numbers of constellation figures adopted in each transferring process in this method and corresponding performance analysis:

| Times of transferring | Number of constellation figure | Performance analysis |
| --- | --- | --- |
| The 1st transferring | FIG. 1 | Reliability of $i_1q_1$ is greater than that of $i_2q_2$ |
| The 2nd transferring | FIG. 2 | After changing mapping relationship between $i_1q_1$ and $i_2q_2$, reliability of $i_2q_2$ is greater than that of $i_1q_1$ |
| The 3rd transferring | FIG. 3 | Reliability of $i_1q_1$ is greater than that of $i_2q_2$; this transferring is inverse mapping of the 1st transferring $i_2q_2$ |
| 4th transferring | FIG. 4 | Reliability of $i_2q_2$ is greater than that of $i_1q_1$; this transfer is inverse mapping of the 2nd transfer $i_1q_1$ |
| Later transferring | FIG. 1~FIG. 4 | The four constellation figures from 1 to 4 defined above are employed periodically |

Table 1 Constellation Figures Used in Data Transferring and its Performance Analysis It can be seen from the above analysis all of the possible mapping relationships for the selected constellation figures that may be used should be stored at both sending side and receiving side in order to transfer and modulate data correctly, which will tremendously increase the storage amount. As for higher order modulations, more constellation figures may be used and therefore larger storage capacity will be required.

SUMMARY OF THE INVENTION

In one aspect, the present invention provides a data re-transferring method based on bit transformation which is capable of reducing storage amount and keeping balance of reliability of each bit within the same symbol after multiple re-transferring processes, so as to improve performance of decoder and increase reliability of data transferring process.

It can be seen from the four constellation figures adopted in HARQ retransferring method, if the data is re-transferred with two partial or entire symmetric constellation figures, reliability of $i_1$, $i_2$ or $q_1$, $q_2$ in $i_1q_1i_2q_2$ within each symbol will be just opposite. Therefore, if using the same constellation figure and exchanging the locations of bits within each symbol, namely, interchanging the locations of $i_1$ and $i_2$, or those of $q_1$ and $q_2$, the effect will be the same as that of changing constellation figures. Moreover, in the method of exchanging bit locations, only one constellation figure is needed to store at sending and receiving sides, and storage requirement is perfectly small.

Therefore, various embodiments of the invention can be achieved by the following technical schemes.

A data re-transferring method is based on bit transformation. The location of each bit modulated is exchanged to a symbol in a constellation figure used in Quadrature Amplitude Modulation (QAM) according to selected transformation modes before implementing QAM during each data re-transferring process.

The method may further comprise presetting the transformation mode representing no bit location transformation at mode 0, modulating and transmitting data with mode 0 during the first data transferring process. It is judged whether it is needed to re-transfer the data after completion of the first data transferring process. If not, new data can be transferred as above. Otherwise, further judging can be performed to determine whether all of the selected transformation modes have been used. If not, the next mode is selected in turn but, if so, the modes are selected in turn from mode 0 again. The locations of bits are exchanged within the symbol according to the selected mode and then the processed data is modulated and transmitted.

In the above-mentioned method, the transformation mode represents location arrangement sequence of the bits modulated to a symbol.

In the above-mentioned method, exchanging the location of each bit is implemented in a bit transformation device which includes a serial/parallel converter, a register and a controller. The implementation of exchanging the location of each bit in a bit transformation device comprises: converting the inputted serial data to parallel data with the serial/parallel converter in the bit transformation device and sending the parallel data to the register for storing first; then, controlling output order of the locations of the bits constituting the parallel data with the controller during outputting the parallel data so as to complete bit location transformation.

When the order of QAM is $2^n$, each symbol in the QAM constellation figure is composed of n bits. The bit number n is equal to or greater than 4. The sequence of bits modulated to a symbol in the QAM constellation figure can be set at $i_1 q_1 \ldots i_m q_m$ and number of the bit transformation modes for each symbol can be set at $(m!)^2$. Here, m is n/2.

The key point of the invention is to exchange the location of each bit constituting data before implementing modulation during each data re-transferring process.

In the data re-transferring method based on bit transformation provided in the invention, the reliability of different bits within the same symbol is changed through exchanging the locations of the bits within the data before each data re-transferring process. In this way, balance of reliability of different bits within a symbol is kept after multiple transferring processes. Because only one constellation figure is used during each re-transferring process, it is enough for the sending and receiving sides to store just one basic constellation figure mapping relationship, which can reduce the storage amount and further improve reliability of data transferring process.

DETAILED DESCRIPTION OF ILLUSTRATIVE EMBODIMENTS

The present invention will be described in more detail hereinafter with reference to the accompanying drawings.

Assume the communication system adopts high order modulation and supports re-transferring mechanism, and assume the order of the high order modulation is $2^n$, which means each point (each symbol) in the constellation figure is composed of n bits, wherein each symbol can be presented with bit series $i_1 q_1 \ldots i_m q_m$ (m=n/2). Because the reliability of different bits within each symbol in high order modulation is different, in the present invention, the object of balancing reliability of each bit is achieved via multiple re-transferring processes, in each of which reliability of the corresponding bits is changed through adjusting bit locations. A specific operation for bit transformation is exchanging $i_1, i_2, \ldots, i_m$ or $q_1, q_2, \ldots, q_m$. Generally, there are $(m!)^2$ combinations for location exchanging, each of which corresponds to one number, for instance, the number for the mode of no data bit transformation is zero, and other modes are numbered in series. It is enough to select only one of the exchanging modes to implement location transform for the data bits to be transferred.

Taking data transferring process with 16QAM high order modulation as an example, the order number of the high order modulation is $2^4$, namely, n is 4, each point (each symbol) in the constellation figure is composed of 4 bits, wherein each symbol can be expressed with bit series $i_1 q_1 i_2 q_2$.

As for 16QAM high order modulation, there are four bit-transforming modes within each symbol, which are $i_1 q_1 i_2 q_2$, $i_2 q_1 i_1 q_2$, $i_1 q_2 i_2 q_1$, $i_2 q_2 i_1 q_1$ respectively. Among which $i_1 q_1 i_2 q_2$ is appointed as original state without bit transformation, the number is correspondingly signed as 0, other modes are numbered in series as mode1, mode2 and mode3.

Figure 1:
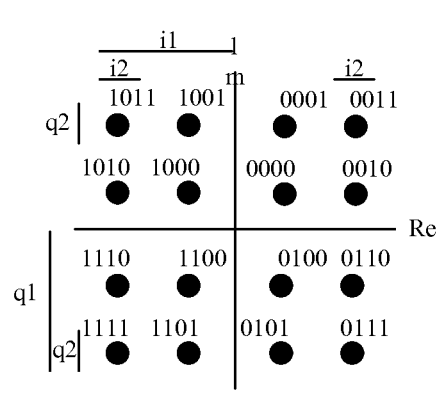
FIG. 1 is a constellation figure illustrating the first 16QAM constellation used in data re-transferring operation with HARQ method.
Figure 2:
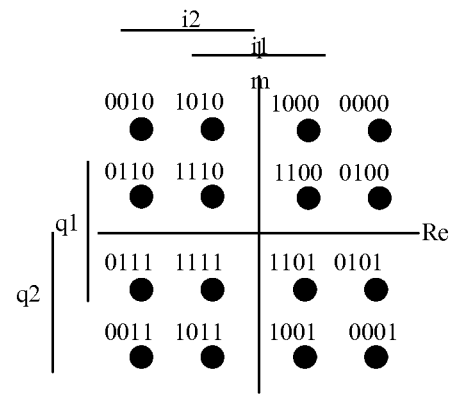
FIG. 2 is a constellation figure illustrating the second 16QAM constellation used in data re-transferring operation with HARQ method.
Figure 3:
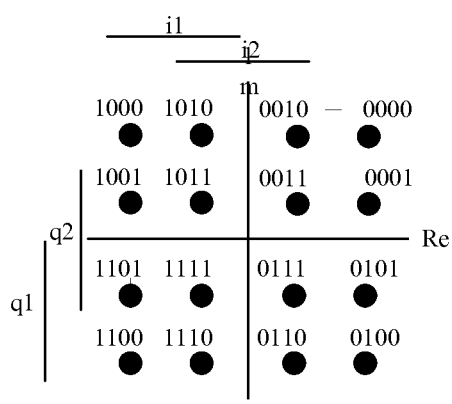
FIG. 3 is a constellation figure illustrating the third 16QAM constellation used in data re-transferring operation with HARQ method.
Figure 4:
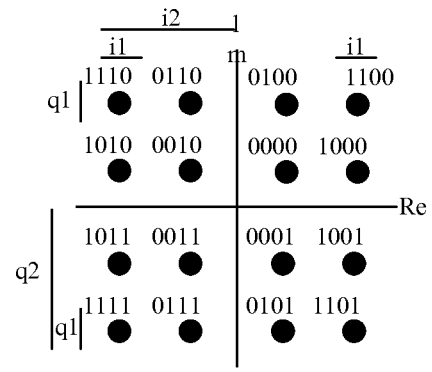
FIG. 4 is a constellation figure illustrating the fourth 16QAM constellation used in data re-transferring operation with HARQ method.
Figure 5:
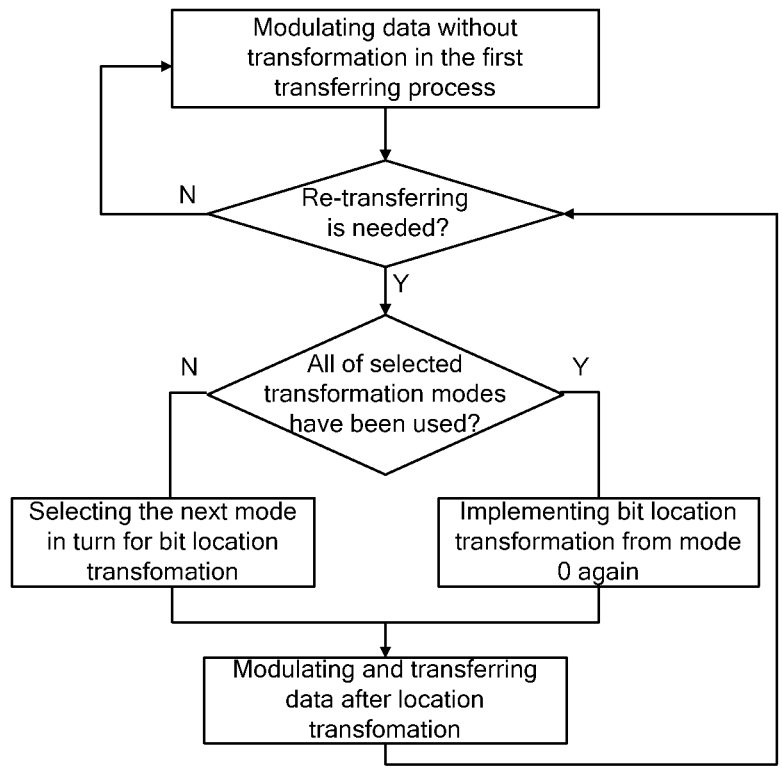
FIG. 5 is a flow chart of data re-transferring process according to the present invention.

As shown in FIG. 5, while transferring and re-transferring data with the method according to the present invention, the operation process at sending side at least comprises the following steps.

1) At first transferring process, no transformation is implemented for data bits, which means the data bits are modulated and transmitted under mapping relationship in the constellation figure according to bit transformation mode 0.

2) After the completion of data transmission, the system will judge whether it is needed to re-transfer the data, if the last data transmission succeeds, then go back to step 1) to transfer new data, otherwise go to step 3) for data retransferring.

3) If data retransferring is needed, the system judges whether all of the four selected transferring modes have been employed, if no, then the system selects a mode in turns next to the used one; if so, then restarts from mode 0. After having selected the bit transformation mode, the system will transform the data bits according to the selected mode, and then, modulate and transmit the data based on the mapping relationship in the constellation figure, and at last return to step 2).

In step 3), two methods can be adopted when transforming the data bits to be transmitted according to the selected bit transformation mode, which are hardware mode and software mode.

Figure 6:
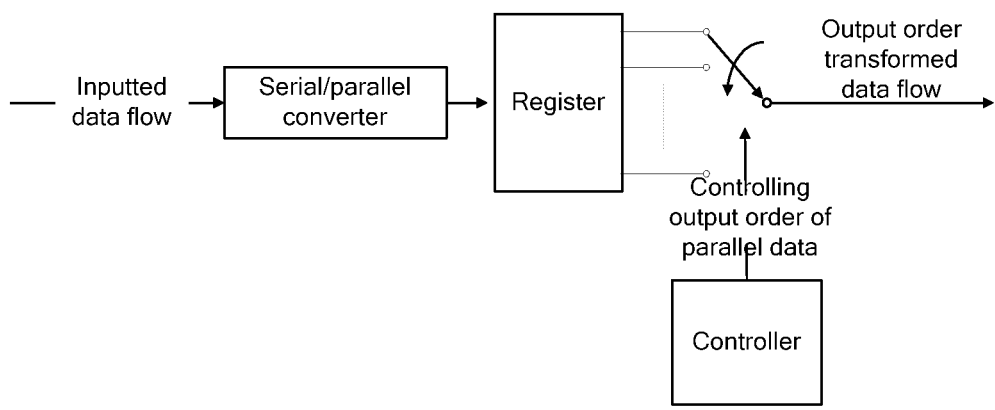
FIG. 6 illustrates an embodiment according to the present invention.

When implementing bit transform with hardware mode, as shown in FIG. 6, the bit transformation device at least comprises a serial/parallel converter 50, a register 51 and a controller 52. The controller 52 is used for controlling output order of the bits so as to implement exchanging for the bit locations. At sending side, the serial/parallel converter 50 converts the inputted serial data flow to parallel data, and transmits the data to the register 51 for storing. Then, the controller 52 controls output order of the bit locations of the parallel data so as to exchange locations of the data bits, then modulates and transmits the data flow after transformation at last. Similarly, there are also equipped a bit transformation device at the receiving side. After modulating the received data, the system recovers original order of the data bits through inverse transformation made by the bit transformation device, and implements the following processes. Selected bit transformation modes and the selecting order for them are preset in the controller 52.

The bit transformation can also be implemented by means of software programming. In this mode, data locations are stored by means of array or queue, and rearranged according to the predetermined transforming modes. The transformed data are modulated and outputted. When compared with hardware device, the speed of process with the software mode is slower.

In the present invention, the locations of data bits are transformed before high order modulation, rather than rearranging directly on the constellation figures. Therefore, only one constellation figure is enough for the method, which can reduce storage requirements while transmitting data, and keep reliability of each bit within the same data symbol consistent after multiple re-transferring operations.

According to the present invention, when selecting combination modes of data bit location transform, not only some random modes can be selected, but also all the $(m!)^2$ modes can be selected.

In a word, the forgoing discussion discloses and describes merely preferred embodiment of the present invention, and is not to be construed as limiting the present invention.

What is claimed is:

1. A data re-transferring method in a communication system, the method comprising:
converting serial data into parallel data;
selecting a bit transformation mode;
swapping locations of at least a portion of bits within a bit sequence of the parallel data according to the selected bit transformation mode to obtain a modified bit sequence having bits with swapped locations;
performing quadrature amplitude modulation (QAM) on the modified bit sequence, wherein performing QAM on the modified bit sequence comprises mapping the modified bit sequence to a symbol of a constellation figure; and
outputting the symbol of the constellation figure having the modified bit sequence mapped thereto.

2. The method according to claim 1, wherein the swapping comprises:
controlling an output order of the bits in the bit sequence of the parallel data during outputting of the parallel data.

3. The method according to claim 1, wherein the method further comprises processing bit inversion.

4. The method according to claim 1, wherein the symbol is composed of n bits, wherein n is an integer, and wherein the order of the performed QAM is $2^n$.

5. The method according to claim 4, wherein n is 4, 6 or 8.

6. The method according to claim 1, wherein the selected bit transformation mode is selected from a plurality of bit transformation modes.

7. The method according to claim 1, wherein the bit sequence is composed of 4 bits and the at least a portion of bits within the bit sequence comprises 4 bits.

8. The method according to claim 1, wherein the bit sequence is composed of 6 bits and the at least a portion of bits within the bit sequence comprises 4 bits.

9. A data transferring device, comprising:
a serial/parallel converter for converting serial data into parallel data;
a bit transformation controller for selecting a bit transformation mode and swapping locations of at least a portion of bits within a bit sequence of the parallel data according to the selected bit transformation mode to obtain a modified bit sequence having bits with swapped locations;
a modulator for performing quadrature amplitude modulation (QAM) on the modified bit sequence having bits with swapped locations, wherein performing QAM on the modified bit sequence comprises mapping the modified bit sequence to a symbol of a constellation figure; and
a transmitter for transmitting the symbol of the constellation figure having the modified bit sequence mapped thereto.

10. The device according to claim 9, further comprising:
a memory for storing the constellation figure.

11. The device according to claim 9, wherein the selected bit transformation mode is selected from a plurality of bit transformation modes.

12. The device according to claim 9, wherein the order of the performed QAM is $2^n$, wherein the symbol is composed of n bits, and wherein n is an integer.

13. The device according to claim 12, wherein n is 4, 6 or 8.

14. The device according to claim 9, wherein the bit sequence is composed of 4 bits and the at least a portion of bits within the bit sequence comprises 4 bits.

15. The device according to claim 9, wherein the bit sequence is composed of 6 bits and the at least a portion of bits within the bit sequence comprises 4 bits.

16. The device according to claim 9, further comprising:
a register for storing the parallel data.

17. A data receiving device, comprising:
a receiver for receiving a modulated bit sequence mapped to a symbol of a constellation figure from a data transmitting device;
a demodulator for demodulating the modulated bit sequence; and
a bit transformation device for performing an inverse location exchange of at least a portion of bits within the demodulated bit sequence to recover an original order of the demodulated bit sequence.

18. The device according to claim 17, wherein the demodulated bit sequence is composed of 4 bits and the at least a portion of bits within the demodulated bit sequence comprises 4 bits.

19. The device according to claim 17, wherein the demodulated bit sequence is composed of 6 bits and the at least a portion of bits within the demodulated bit sequence comprises 4 bits.

20. A data receiving method, comprising:

receiving, by a data receiving device, a modulated bit sequence mapped to a symbol of a constellation figure from a data transmitting device;

demodulating, by the data receiving device, the received modulated bit sequence; and performing, by the data receiving device, an inverse location exchange of at least a portion of bits within the demodulated bit sequence mapped to the symbol to recover an original order of the demodulated bit sequence.

21. The method according to claim 20, wherein the demodulated bit sequence is composed of 4 bits and the at least a portion of bits within the demodulated bit sequence comprises 4 bits.

22. The method according to claim 20, wherein the demodulated bit sequence is composed of 6 bits and the at least a portion of bits within the demodulated bit sequence comprises 4 bits.

\* \* \* \* \*